(12) United States Patent
Turtinen et al.

(10) Patent No.: US 12,324,023 B2
(45) Date of Patent: *Jun. 3, 2025

(54) ENHANCEMENTS ON SMALL DATA TRANSMISSION

(71) Applicant: Nokia Technologies Oy, Espoo (FI)

(72) Inventors: Samuli Heikki Turtinen, Oulu (FI); Jussi-Pekka Koskinen, Oulu (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,379

(22) Filed: Oct. 17, 2024

(65) Prior Publication Data

US 2025/0048439 A1 Feb. 6, 2025

Related U.S. Application Data

(63) Continuation of application No. 18/560,426, filed as application No. PCT/CN2021/094804 on May 20, 2021.

(51) Int. Cl.
| | |
|---|---|
| *H04W 74/0833* | (2024.01) |
| *H04W 28/02* | (2009.01) |
| *H04W 72/115* | (2023.01) |
| *H04W 76/27* | (2018.01) |

(52) U.S. Cl.
CPC ... *H04W 74/0833* (2013.01); *H04W 28/0278* (2013.01); *H04W 72/115* (2023.01); *H04W 76/27* (2018.02)

(58) Field of Classification Search
CPC ............ H04W 74/0833; H04W 76/27; H04W 72/115; H04W 28/0278
See application file for complete search history.

(56) References Cited

U.S. PATENT DOCUMENTS

| | | | |
|---|---|---|---|
| 2018/0310309 A1 | 10/2018 | Koskela et al. | |
| 2021/0274525 A1* | 9/2021 | Wei | H04W 72/23 |
| 2022/0007423 A1* | 1/2022 | Agiwal | H04W 76/27 |
| 2022/0095409 A1* | 3/2022 | Agiwal | H04W 74/0833 |

(Continued)

OTHER PUBLICATIONS

"Work Item on NR smalldata transmissions in INACTIVE state", 3GPP TSG RAN Meeting #91e, RP-210870, Agenda: 9.1.2, ZTE Corporation, xx-xx, 2021, 5 pages.

(Continued)

*Primary Examiner* — Brian D Nguyen
(74) *Attorney, Agent, or Firm* — Nokia Technologies Oy

(57) ABSTRACT

Embodiments of the present disclosure relate to methods, devices, apparatuses, and computer readable medium for small data transmission (SDT). A first device, in response to first data to be transmitted via a SDT corresponding to a first set of resources for a random access procedure and a second set of resources for a configured grant procedure, determine a target resource for at least a part of the first data based on a logical channel restriction on the SDT; and transmit, to a second device, at least the part of the first data on the target resource. In this way, the SDT procedure can be performed with logical channel restrictions, which allows a better isolation of services through specific resource selection. The communication efficiency and network performance can also be improved.

18 Claims, 4 Drawing Sheets

(56) References Cited

U.S. PATENT DOCUMENTS

| | | | | |
|---|---|---|---|---|
| 2022/0116152 | A1* | 4/2022 | Iyer | H04L 1/1896 |
| 2023/0070446 | A1* | 3/2023 | Lee | H04W 76/10 |
| 2023/0156821 | A1* | 5/2023 | Xing | H04W 74/04 |
| | | | | 370/329 |
| 2024/0373276 | A1* | 11/2024 | Yue | H04W 74/0833 |
| 2024/0373286 | A1* | 11/2024 | Fang | H04L 47/30 |

OTHER PUBLICATIONS

"Report of [AT113bis-e][501][SDT] UP SDT open issues", 3GPP TSG-RAN2 #113bis-e, R2-2104395, Agenda: 8.6.2, LG Electronics, Apr. 12-20, 2021, pp. 1-20.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project, Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"Report of [AT113bis-e][501][SDT] UP SDT open issues", 3GPP TSG-RAN2 #113bis-e, R2-210xxxx, Agenda: 8.6.2, LG Electronics, Apr. 12-20, 2021, pp. 1-13.

International Search Report and Written Opinion received for corresponding Patent Cooperation Treaty Application No. PCT/CN2021/094804, dated Feb. 16, 2022, 9 pages.

"Handling of Configured grant for SDT", 3GPP TSG RAN WG2 Meeting #112-e, R2-2008995, Agenda: 8.6.5, Intel Corporation, Nov. 2-13, 2020, 4 pages.

"RRC aspects for SDT", 3GPP TSG-RAN WG2 #112e, R2-2009966, Agenda: 8.6.3, Ericsson, Nov. 2-13, 2020, pp. 1-5.

"Details of CG based SDT", 3GPP TSG-RAN WG2 #112e, R2-2009964, Agenda: 8.6.5, Ericsson, Nov. 2-13, 2020, pp. 1-4.

* cited by examiner

ENHANCEMENTS ON SMALL DATA TRANSMISSION

RELATED APPLICATIONS

This application is a 37 C.F.R. § 1.53 (b) continuation of co-pending U.S. patent application Ser. No. 18/560,426 filed Nov. 13, 2023, which claims priority to PCT Application No. PCT/CN2021/094804, filed on May 20, 2021, which is incorporated herein by reference in its entirety.

FIELD

Embodiments of the present disclosure generally relate to the field of telecommunication and in particular, to devices, methods, apparatus and computer readable storage media of small data transmission (SDT).

BACKGROUND

As communication technologies evolve to the fifth-generation new radio, which is also referred to as 5G NR, a new RRC mode, i.e., RRC_INACTIVE mode, has been introduced to adapt to new application scenarios and service characteristics. In the RRC_INACTIVE mode, the terminal device operates in a low power consumption manner, like a "sleep" mode, and may perform the SDT for transmission and/or receipt of infrequent and small data.

The SDT may be based on a random access channel (RACH) procedure or a configured grant (CG) procedure. Typically, the base station preconfigures resources for the uplink (UL) data to be transmitted via the SDT. The terminal device is allowed to perform subsequent UL or DL data transmissions after the initial SDT without transitioning to the RRC_CONNECTED mode. In this case, the subsequent data transmissions are scheduled via, for example, dynamic grants. There is a concern on how to coordinate multi-shot SDTs, as well as how to arrange a subsequent data transmission during an ongoing SDT.

SUMMARY

In general, example embodiments of the present disclosure provide a solution for small data transmission. Embodiments that do not fall under the scope of the claims, if any, are to be interpreted as examples useful for understanding various embodiments of the disclosure.

In a first aspect, there is provided a first device. The first device comprises: at least one processor; and at least one memory including computer program codes. The at least one memory and the computer program codes are configured to, with the at least one processor, cause the first device to: in response to first data to be transmitted via a small data transmission, SDT, corresponding to a first set of resources for a random access, RA, procedure and a second set of resources for a configured grant, CG, procedure, determine, at the first device, a target resource for at least a part of the first data based on a logical channel restriction on the SDT; and transmit, to a second device, at least the part of the first data on the target resource.

In a second aspect, there is provided a second device. The second device comprises: at least one processor; and at least one memory including computer program codes. The at least one memory and the computer program codes are configured to, with the at least one processor, cause the second device to: transmit, to a first device, a physical downlink control channel, PDCCH, order addressed by a paging radio network temporary identifier for the first device, the PDCCH order comprising a request for an indication that at least one multicast broadcast service is to be received by the first device; and receive, from the first device, a random access preamble associated with the at least one multicast broadcast service as a response to the request.

In a third aspect, there is provided a method. The method comprises: in response to first data to be transmitted via a small data transmission, SDT, corresponding to a first set of resources for a random access, RA, procedure and a second set of resources for a configured grant, CG, procedure, determining, at a first device, a target resource for at least a part of the first data based on a logical channel restriction on the SDT; and transmitting, to a second device, at least the part of the first data on the target resource.

In a fourth aspect, there is provided a method. The method comprises: transmitting, at a second device and to a first device, a first message comprising a logical channel restriction on a small data transmission, SDT performed between the first device and the second device; and receiving, from the first device, at least a part of first data on a target resource determined based on the logical channel restriction.

In a fifth aspect, there is provided a first apparatus. The first apparatus comprises: means for in response to first data to be transmitted via a small data transmission, SDT, corresponding to a first set of resources for a random access, RA, procedure and a second set of resources for a configured grant, CG, procedure, determining a target resource for at least a part of the first data based on a logical channel restriction on the SDT; and means for transmitting, to a second device, at least the part of the first data on the target resource.

In a sixth aspect, there is provided a second apparatus. The second apparatus comprises: means for transmitting, to a first device, a first message comprising a logical channel restriction on a small data transmission, SDT performed between the first device and the second device; and means for receiving, from the first device, at least a part of first data on a target resource determined based on the logical channel restriction.

In a seventh aspect, there is provided a non-transitory computer readable medium. The non-transitory computer readable medium comprises program instructions for causing an apparatus to perform the method according to the third aspect.

In an eighth aspect, there is provided a non-transitory computer readable medium. The non-transitory computer readable medium comprises program instructions for causing an apparatus to perform the method according to the fourth aspect It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
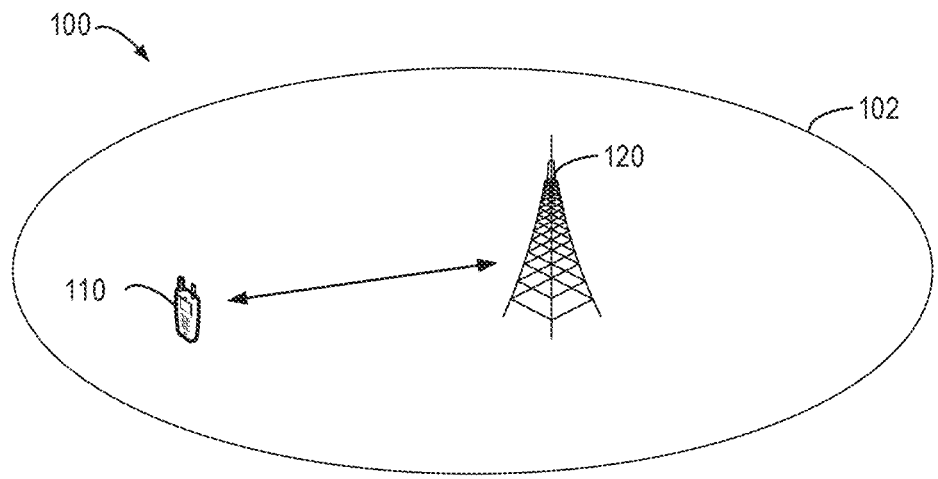
FIG. 1 illustrates an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In a legacy communication network, terminal devices are applied to logical channel restrictions when performing data transmissions in the RRC_CONNECTED mode. In short, when a new data transmission is performed, the terminal device selects a logical channel that satisfies preconfigured logical channel restrictions for the UL grant.

Specifically, the logical channel restrictions are utilized in a medium access control (MAC) entity of the terminal device for specifying the selection of logical channels in terms of one or more of the following:

- a set of allowed subcarrier spacing index values in allowedSCS-List, if configured, includes the subcarrier spacing index associated to the UL grant;
- maxPUSCH-Duration, if configured, is larger than or equal to the PUSCH transmission duration associated to the UL grant;
- configuredGrantType1Allowed, if configured, is set to true in case the UL grant is a configured grant type 1; and
- allowedServingCells, if configured, includes the cell information associated to the UL grant. This may not apply to the logical channels associated with a DRB configured with packet data convergence protocol (PDCP) duplication within the same MAC entity (i.e. carrier aggregation (CA) duplication) when CA duplication is deactivated for this DRB in the MAC entity; and
- allowedCG-List, if configured, includes the configured grant index associated to the UL grant; and
- allowedPHY-PriorityIndex, if configured, includes the priority index associated to the dynamic UL grant.

In order to solve the above and other potential problems regarding resource selection, coordination and arrangement in SDT, embodiments of the present disclosure provide an enhanced SDT mechanism. Generally, it applies the logical channel restrictions in RRC_CONNECTED mode to the SDT in RRC_INACTIVE mode. This would allow a better isolation of services through specific resource selection. For example, some of DRBs may be configured for the SDT to access only the resources for the CG-based SDT, some of the DRBs are configured to access only the resources for RA-based SDT, while some of the DRBs are allowed to access both the resources for the CG-based SDT and resources for the RA-based SDT.

Further, the logical channel restrictions may also help to arrange an ongoing SDT (e.g., on resources for the CG-based SDT) and a transmission of new data that is not allowed to access the resources for the CG-based SDT.

FIG. 1 illustrates an example communication network 100 in which example embodiments of the present disclosure can be implemented. As shown in FIG. 1, the communication network 100 includes a first device 110 and a second device 120.

The first device 110 (hereinafter may also be referred to as a terminal device 110 or a UE 110) is located within a cell 102 of the second device 120, and may communicate with the second device 120. When entering the RRC_INACTIVE mode, the first device 110 may perform uplink (UL) and/or downlink (DL) data transmissions via the SDT procedure, which can be achieved based on a Random Access Channel (RACH) procedure or a configured grant (CG) procedure.

The second device 120 (hereinafter may also be referred to as a network device 120 or a gNB 120) provides the cell 102 and serves the first device 110. The second device 120 may configure a data size threshold for the first device 110 to determine whether to transmit data via the SDT procedure. If a size of the data is smaller than the data size threshold (e.g., 1000 bits), the first device 110 may determine to transmit the data via the SDT. Otherwise, the terminal device may not use SDT for transmitting the data in RRC_INACTIVE state.

The second device 120 may allocate resources for the UL and/or DL data transmissions to the first device 110. In some example embodiments, the second device 120 may allocate a first set of resources for the RA-based procedure and a second set of resources for the CG procedure.

In some example embodiments, the SDT may be based on a 2-step RACH procedure, and in this case, the first device 110 may transmit the MSG A for the SDT payload on the physical uplink shared channel (PUSCH). Alternatively, the SDT may be based on a 4-step RACH procedure, and in this case, the first device 110 may transmit the MSG 3 for the SDT payload on the PUSCH.

In some other example embodiments, the SDT may be based on CG type 1, and if the first device 110 has a valid timing advance (TA), the first device 110 may transmit the SDT payload on the PUSCH without the RACH procedure.

Additionally, the first device 110 may perform a so-called multi-shot SDT procedure. During the multi-shot SDT procedure, the first device 110 may transmit multiple subsequent UL and/or DL data transmissions after the initial SDT transmission without transitioning to the RRC_CONNECTED mode. In other words, the first device 110 may transmit a larger size of UL transmissions to the second device 120 via multiple SDT transmissions. The subsequent transmissions may be scheduled via dynamic grants.

The SDT between the first device 110 and the second device 120 may be performed under at least one logical channel restriction. The logical channel restriction may indicate, for example, respective priorities of data, subcarrier spacing indexes, durations of UL transmissions, cell information, grant indexes corresponding to the first set of resources and the second set of resources, each of resources associated with at least one logical channel corresponding to one of a RA-based SDT procedure, a CG-based SDT procedure or a non-SDT procedure. The logical channel restriction may be dedicated to the SDT, or alternatively, follow the logical channel restriction configured for the RRC_CONNECTED mode.

The logical channel restrictions may also comprise restrictions for a logical channel to access and/or to be transmitted over RA-based SDT resources or CG-based SDT resources. In one example, multiple CG-based SDT resources may be configured for the first device 110 and there may be separate logical channel restrictions for each of such CG-based SDT resources. Additionally, the logical channel restrictions may comprise restrictions for a logical channel to access and/or to be transmitted over 2-step RACH or 4-step RACH.

The logical channel restriction may specify the resource selection of the SDT. As an example, it may follow a general principle of first the CG-based SDT, next the RA-based SDT, and finally the non-SDT procedure, if possible. Upon arrival of data, if the criteria associated with the CG-based SDT are met, the first device 110 may initiate the SDT based on the CG procedure. The criteria associated with the CG-based SDT may include, for example, a volume of the data not exceeding a data volume threshold; the RSRP is greater than or equal to a preconfigured RSRP threshold; and/or the resources for the CG-based SDT is configured on the selected UL carrier and are valid (for example, a beam or Synchronization Signal Block (SSB) that is configured with CG-based SDT resources is above a certain RSRP threshold level).

Otherwise, the first device 110 may determine whether the criteria associated with the RA-based SDT are met, and if met, the first device 110 may initiate the SDT based on the RA procedure. The criteria associated with the RA-based SDT may be similar to the criteria associated with the CG-based SDT, which includes, for example, a volume of the data not exceeding a data volume threshold; the RSRP is greater than or equal to a preconfigured RSRP threshold; and/or the resources for the RA-based SDT are configured on the selected UL carrier.

If neither the criteria associated with the CG-based SDT nor the criteria associated with the RA-based SDT are met, the first device 110 may initiate the non-SDT procedure for transmission of the data, for example, a RRC resume procedure.

When entering the RRC_CONNECTED mode, the first device 110 may perform UL and/or DL transmissions via the non-SDT procedure. For example, the first device 110 may trigger a RRC resume procedure for the UL and/or DL transmissions.

It is to be understood that the number of terminal devices and network devices are only for the purpose of illustration without suggesting any limitations. The communication network 100 may include any suitable number of terminal devices adapted for implementing embodiments of the present disclosure. Although not shown, it would be appreciated that one or more additional devices may be located in the cell 102, and one or more additional cells may be deployed in the environment 100.

Only for ease of discussion, the first device 110 is illustrated as a UE, and the second device 120 is illustrated as a base station. It is to be understood that UE and base station are only example implementations of the first device 110 and the second device 120 respectively, without suggesting any limitation as to the scope of the present application. Any other suitable implementations are possible as well.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for NR, and the NR terminology is used in much of the description below.

Figure 2:
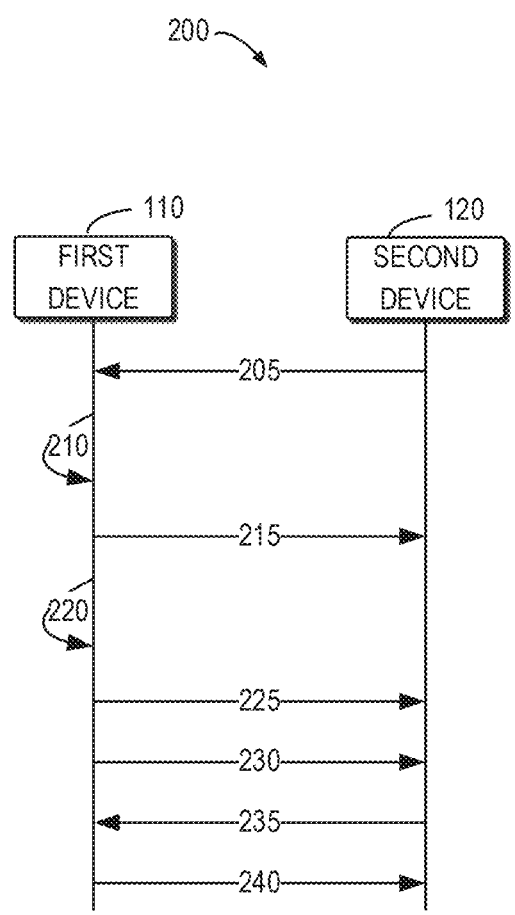
FIG. 2 shows a signaling chart illustrating a process of small data transmission procedure according to some example embodiments of the present disclosure.

Principle and implementations of the present disclosure will be described in detail below with reference to FIG. 2. FIG. 2 shows a signaling chart illustrating a process of small data transmission procedure according to some example embodiments of the present disclosure. For the purpose of discussion, the process 200 will be described with reference to FIG. 1. The process 200 may involve the first device 110 and the second device 120.

The second device 120 may preconfigure resources to the first device 110 for data transmissions via the SDT. For example, a first set of resources may be configured for the RA-based SDT procedure, and a second set of resources may be configured for the CG-based SDT procedure. The first device 110, when operating in the RRC_CONNECTED mode, may select a target resource for transmission of data in RA-based SDT, CG-based SDT or a non-SDT procedure.

As shown in FIG. 2, the second device 120 transmits 205, to the first device 110, a first message including at least one logical channel restriction for determining a target resource for data transmission. The first message may be system information message (for example, system information block (SIB)) or a RRC message (for example, RRCRelease message or RRCReconfiguration message).

In some example embodiments, the logical channel restriction may indicate at least one of the following: respective priorities of data, subcarrier spacing indexes, durations of uplink channel transmissions, cell information, grant indexes corresponding to the first set of resources and the second set of resources, or each of resources associated with at least one logical channel corresponding to one of a RA-based SDT procedure, a CG-based SDT procedure or a non-SDT procedure.

Upon arrival of first data, the first device 110 may determine that the first data is to be transmitted via the SDT corresponding to a first set of resources for the RA procedure and a second set of resources for the CG procedure. In other words, the first data may be available for multiple DRBs configured for the SDT, that is, some of the first data may be available for the CG-based SDT, while the rest of the first data may be available for the RA-based SDT.

The first device 110 determines 210 a target resource for at least a part of the first data based on the logical channel restriction on the SDT. For example, the first device 110 may select the target resource from the first set of resources and the second set of resources based on the logical channel restriction, which will be discussed in details below.

In some example embodiments, the logical channel restriction may indicate a priority of data associated with respective DRB for the SDT. For example, a part of the first data may correspond to a first priority associated with the DRB for the CG-based SDT, while the rest of the data may correspond to a second priority associated with the DRB for the RA-based SDT. If the first priority is higher than the second priority, the first device 110 may determine to initiate the SDT based on the CG procedure (also referred to as the CG-based SDT procedure) and select the target resource that corresponds to the part of the first data from the first set of resources.

For another example, if the first priority exceeds a priority threshold, while the second priority does not exceed the priority threshold, the first device 110 may determine to initiate the SDT based on the CG procedure and select the target resource that corresponds to the part of the first data from the first set of the resources. The priority threshold may be either configured by the second device 120 or predefined at the first device 110.

In some example embodiments, the logical channel restriction may indicate an amount of data associated with respective DRB for the SDT. The amount of data may be evaluated by duration of UL channel transmission. For example, a part of the first data may correspond to the DRB for the CG-based SDT, while the rest of the data may correspond to the DRB for the RA-based SDT. If a first amount of the part of the first data is larger than a second amount of the rest of the first data, the first device 110 may determine to initiate the SDT based on the CG procedure and select the target resource corresponding to the part of the first data from the first set of the resources for the CG-based SDT.

For another example, if the first amount exceeds a data amount threshold, while the second amount does not exceed the data amount threshold, the first device 110 may determine to initiate the SDT based on the CG procedure and select the target resource that corresponds to the part of the first data from the first set of the resources. The priority threshold may be either configured by the second device 120 or predefined at the first device 110.

In some example embodiments, if the first data is available for transmission via both the CG-based SDT procedure and the RA-based SDT procedure, the first device 110 may determine to transmit the first data via a non-SDT procedure, for example, a RRC resume procedure. In these embodiments, the first device 110 may transmit, to the second device 120, a request for initiating the non-SDT procedure for transmission of the first data. The first device 110 may then receive, from the second device 120, a response message indicating the target resource allocated for transmission of the first data via the non-SDT procedure. Alternatively, if the first data is available for transmission via both the CG-based SDT procedure and the RA-based SDT procedure, the first device 110 may determine to transmit the first data via either CG-based SDT procedure or RA-based SDT procedure based on other conditions as defined earlier.

The first device 110 transmits 215 at least a part of the first data to the second device 120. In the above embodiments where the non-SDT procedure is initiated, the first device 110 may transmit the first data via the non-SDT procedure.

In the above embodiments where the first device 110 transmits a part of the first data on the target resource via one of the CG-based SDT procedure and the RA-based SDT procedure, after the transmission of the part of the first device is completed, the first device 110 may transmit the rest of the data via the other one of the CG-based SDT procedure and the RA-based SDT procedure.

In some example embodiments, before or during the transmission of the part of the first data, the first device 110 may resume only the DRBs allowed for the one of CG-based SDT procedure or RA-based SDT procedure, that is, the target resource. The DRBs that are prohibited from accessing the first set of resources for the CG-based SDT or the second set of resources for the RA-based SDT may be considered as DRBs for the non-SDT procedure. After the SDT procedure is completed, they may be considered as the DRB for the SDT procedure, unless otherwise configured in the RRC Release message that terminates the SDT procedure. Alternatively, after the SDT procedure is completed, they may still be considered as the DRB for the non-SDT procedure, unless otherwise configured in the RRC Release message that terminates the SDT procedure.

In some example embodiments, during the transmission of the part of the first data, second data to be transmitted may occur at the first device 110. In this case, the first device 110 may determine 220 whether the second data is to be transmitted via the SDT procedure.

If the second data is to be transmitted via the SDT, but corresponds to a first resource for the other one of the RA and CG procedures, the first device 110 may compare a third priority of the second data with the first priority of the part of the first data. If the third priority is higher than the first priority, the first device 110 may terminate the transmission of the part of the first data while transmitting 225 the second data on the first resource based on the other one of the RA and CG procedures. In other words, the first device 110 may terminate the ongoing SDT procedure via one of the RA and CG resources and initiate another SDT procedure via one of the CG and RA resources, respectively. Otherwise, if the third priority is not higher than the first priority, the first device 110 may transmit the second data based on the other one of the RA and CG procedures after the transmission of the part of the first data is completed.

If the first device 110 determines, at 220, that the second data is to be transmitted via the non SDT procedure, the first device 110 may compare the third priority of the second data with the first priority of the part of the first data. If the third priority is higher than the first priority, the first device 110 may terminate the transmission of the part of the first data while transmitting 230, to the second device 120, a request for initiating the non-SDT procedure for transmission of the second data. Upon receipt 235 of a response message for indicating a first resource allocated for transmission of the second data, the first device 110 may transmit 240 the second data on the first resource via the non-SDT procedure.

Otherwise, if the third priority is not higher than the first priority, the first device 110 may initiate the non-SDT procedure for transmission of the second data after the transmission of the part of the first data is completed.

In the above embodiments where the first device 110 transmits a part of the first data via one of the CG-based SDT or RA-based SDT procedure, the first device 110 may transmit, to the second device 120, a buffer status report (BSR) that indicate an amount of the first data. In these embodiments, the first device 110 may then receive, from the second device 120, a message indicating the target resource allocated for transmission of the first data in the RRC_CONNECTED mode.

In some example embodiments, if the first device 110 reselects another cell while being in RRC_INACTIVE mode, the CG-based SDT procedure may not be valid anymore. Hence, in some examples, upon cell reselection, the first device 110 may lift or remove all the logical channel restrictions configured for the first device 110 for use in SDT procedure. That is, the logical channel restrictions may only be applied in the same cell where the first device 110 was previously in RRC_CONNECTED mode. In some examples, upon cell reselection, the first device 110 may consider all the SDT DRBs associated only with CG-based SDT procedure as non-SDT DRBs.

In some example embodiments, the first device 110 may transmit validity information on the assistance information to the second device 120. For example, the validity information may indicate a validity period of the assistance information for configuring SDT parameters. The validity period may be observed by a timer which will be started upon receipt or confirming the request. Upon expiration of the validity period, the second device 120 may not be requested by the first device 110 to provide SDT resources.

It should be understood that the steps and related functions described in process 200 are in no absolute chronological order, and some of the steps may be performed simultaneously or in an order differing from the given one. Other functions can also be executed between the steps or within the steps. Some of the steps can also be left out or replaced with a corresponding step. The present disclosure is not limited in this regard.

According to the example embodiments of the present disclosure, there is provided an enhanced SDT mechanism. The mechanism uses configurable logical channel restrictions to flexibly arrange the data transmissions based on multiple procedures, such as, RA-based SDT, CG-based SDT, or non-SDT procedure. In this way, an isolation of services through specific resource selection can be achieved, and the communication efficiency as well as the system performance can be improved.

Corresponding to the process described in connection with FIG. 2, embodiments of the present disclosure provide a solution for small data transmission involving a terminal device and a network device. These methods will be described below with reference to FIGS. 3-4.

Figure 3:
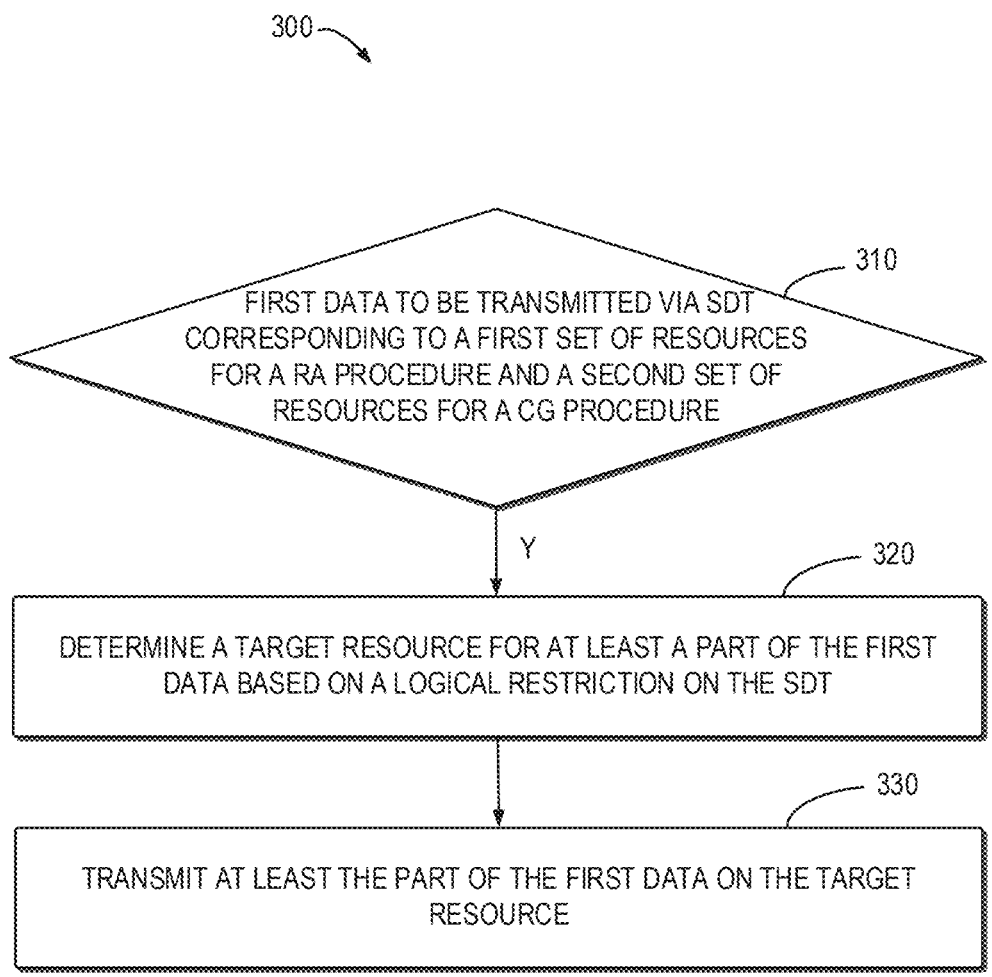
FIG. 3 illustrates a flowchart of an example method for small data transmission implemented at a first device according to example embodiments of the present disclosure.

FIG. 3 illustrates a flowchart of a method 300 for small data transmission implemented at a terminal device according to example embodiments of the present disclosure. The method 300 can be implemented at the first device 110 shown in FIG. 1. For the purpose of discussion, the method 300 will be described with reference to FIG. 1. It is to be understood that method 300 may further include additional blocks not shown and/or omit some shown blocks, and the scope of the present disclosure is not limited in this regard.

As shown in FIG. 3, at block 310, the first device 110 determines whether the first data to be transmitted via a SDT corresponds to a first set of resources for the RA procedure and a second set of resources for the CG procedure.

If the first data includes parts corresponding to the first set of resources and the second set of resources, at block 320, the first device 110 determines a target resource for at least a part of the first data based on a logical channel restriction on the SDT.

In some example embodiments, the first device 110 may receive a first message from the second device 120, and the first message includes the logical channel restriction for determining the target resource. The first message may be system information or a RRC message.

In some example embodiments, the logical channel restriction may indicate at least one of respective priorities of data, subcarrier spacing indexes, durations of uplink channel transmissions, cell information, grant indexes corresponding to the first set of resources and the second set of resources, or each of resources associated with at least one logical channel corresponding to one of a RA-based SDT procedure, a CG-based SDT procedure or a non-SDT procedure.

In some example embodiments, the logical channel restrictions may also comprise restrictions for a logical channel to access and/or to be transmitted over RA-based SDT resources or CG-based SDT resources. In one example, multiple CG-based SDT resources may be configured for the first device 110 and there may be separate logical channel restrictions for each of such CG-based SDT resources. Additionally, the logical channel restrictions may comprise restrictions for a logical channel to access and/or to be transmitted over 2-step RACH or 4-step RACH.

In some example embodiments, the target resource corresponds to the part of the first data with a first priority associated with one of the RA procedure and the CG procedure. The first device 120 may determine that the first priority is higher than a second priority of the rest of the first data, or alternatively, the first priority exceeds a priority threshold. The priority threshold may be either configured by the second device 120 or predefined at the first device 110. In this case, the first device 120 may select, from the first and second sets of resources, the target resource for transmission of the part of the first data via the SDT based on the corresponding one of the RA procedure and the CG procedure.

In some example embodiments, the target resource corresponds to a first amount of the part of the first data associated with one of the RA procedure and the CG procedure. The first device 110 may determine that the first amount is larger than a second amount of the rest of the first data, or alternatively, the first amount exceeds a data amount threshold. The data amount threshold may be either configured by the second device 120 or predefined at the first device 110. In this case, the first device 110 may select, from the first and second sets of resources, the target resource for transmission of the part of the first data via the SDT based on the corresponding one of the RA procedure and the CG procedure.

In some example embodiments, upon determination of the first data corresponding to both the first set of resources for the RA procedure and the second set of resources for CG procedure, the first device 110 may transmit, to the second device 120, a request for initiating a non-SDT procedure for transmission of the first data. The first device 110 may then receive, from the second device 120, a response message indicating the target resource allocated for transmission of the first data via the non-SDT procedure. In this case, the first device 110 may transmit the first data on the target resource via the non-SDT procedure. The non-SDT procedure may be, for example, a RRC resume procedure.

In some example embodiments, upon determination of the first data corresponding to both the first set of resources for the RA procedure and the second set of resources for CG procedure, the first device 110 may transmit, to the second device 120, a buffer status report indicating an amount of the first data. The first device 110 may receive, from the second device 120, a message indicating the target resource allocated for transmission of the first data in a radio resource control connected (RRC_CONNECTED) mode. In this case, the first device 110 may transit from the RRC_INAC- TIVE mode to the RRC_CONNECTED mode. The first device 110 may then transmit the first data on the target resource in the RRC_CONNECTED mode.

At block 330, the first device 110 transmits, to the second device 120, at least the part of the first data on the target resource.

In some example embodiments, during transmission of the part of the first data on the target resource for one of the RA and CG procedures, the first device 110 may determine that second data is to be transmitted via the SDT and corresponds to a first resource for the other one of the RA and CG procedures. In this case, if a second priority of the second data is higher than a first priority of the part of the first data, the first device 110 may terminate the transmission of the part of the first data while transmitting the second data on the first resource based on the other one of the RA and CG procedures. Otherwise, if the second priority of the second data is not higher than the first priority of the part of the first data, the first device 110 may transmit, to the second device 120, the second data based on the other one of the RA and CG procedures after the transmission of the part of the first data is completed.

In some example embodiments, during transmission of the part of the first data on the target resource for one of the RA and CG procedures, the first device 110 may determine that second data is to be transmitted in a non-SDT procedure. In this case, if a second priority of the second data is higher than a first priority of the part of the first data, the first device 110 may terminate the transmission of the part of the first data while transmitting, to the second device 120, a request for initiating the non-SDT procedure for transmission of the second data. Otherwise, if the second priority of the second data is not higher than the first priority of the part of the first data, the first device 110 may transmit, to the second device 120, a request for initiating a non-SDT procedure for transmission of the second data after the transmission of the part of the first data is completed.

According to the example embodiments of the present disclosure, there is provided an enhanced SDT mechanism. The enhanced SDT mechanism supports multi-shot data transmissions via the SDT based on configurable logical channel restrictions. The logical channel restrictions may be either dedicated to the SDT in the RRC_INACTIVE mode, or the same with the logical channel restrictions in the RRC_CONNECTED mode. Further, the error situation where data becomes available on a SDT DRB that is not allowed for the current SDT resources can be handled effectively. As such, the communication efficiency and network performance can be improved.

Figure 4:
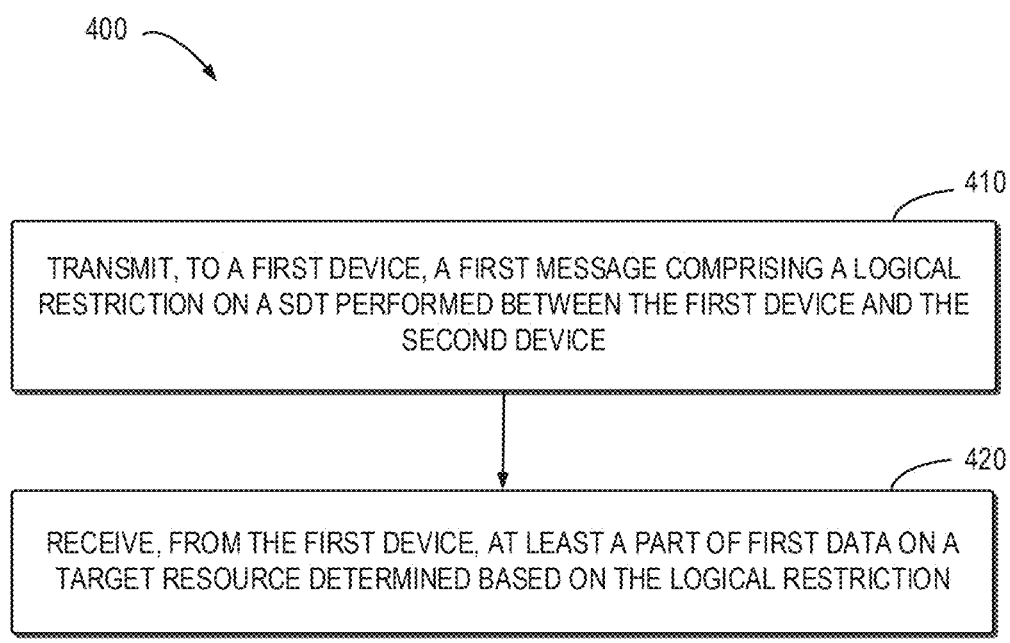
FIG. 4 illustrates a flowchart of an example method for small data transmission implemented at a second device according to example embodiments of the present disclosure.

FIG. 4 illustrates a flowchart of a method 400 for small data transmission at a network device according to example embodiments of the present disclosure. The method 400 can be implemented at the second device 120 shown in FIG. 1. For the purpose of discussion, the method 400 will be described with reference to FIG. 1. It is to be understood that method 400 may further include additional blocks not shown and/or omit some shown blocks, and the scope of the present disclosure is not limited in this regard.

As shown in FIG. 4, at block 410, the second device 120 transmits, to the first device 110, a first message comprising a logical channel restriction on a SDT performed between the first device 110 and the second device 120. The first message may include system information (e.g., system information block (SIB)) or a RRC message (e.g., RRCRelease message or RRCReconfiguration message). The SDT may be performed based on a RA procedure or a CG procedure. The RA procedure may be, for example, a 2-step RACH procedure or a 4-step RACH procedure.

In some example embodiments, the logical channel restriction may indicate at least one of respective priorities of data, subcarrier spacing indexes, durations of uplink channel transmissions, cell information, grant indexes corresponding to a first set of resources for a random access, RA, procedure and a second set of resources for a configured grant, CG, procedure, or each of resources associated with at least one logical channel corresponding to one of a RA-based SDT, a CG-based SDT or a non-SDT procedure.

At block 420, the second device 120 receives, from the first device 110, at least a part of first data on a target resource determined based on the logical channel restriction.

In some example embodiments, the second device 120 may receive, from the first device 110, at least the part of the first data on the target resource via the SDT. The target resource may be determined, by the first device 110, from one of a first set of resources for the RA procedure and a second set of resources for the CG procedure. In other words, in these embodiments, the part of the first data may be received based on one of the RA and CG procedures.

In some example embodiments where the part of the first data is received based on one of the RA and CG procedures, the second device 120 may receive second data on a first resource based on the other one of the RA and CG procedures while the receipt of the part of the first data is terminated.

In some other example embodiments where the part of the first data is received based on one of the RA and CG procedures, the second device 120 may receive a request for initiating a non-SDT procedure for transmission of second data from the first device 110, while the receipt of the part of the first data is terminated. In response to the request, the second device 120 may transmit, to the first device 110, a response message indicating a second resource allocated for transmission of the second data via the non-SDT procedure. The second device 120 may then receive, from the first device 110, the second data on the second resource. The non-SDT procedure may be, for example, a RRC resume procedure.

In some example embodiments, the first data may be received in a non-SDT procedure. In these embodiments, the second device 120 may receive, from the first device 110, a request for initiating the non-SDT procedure for transmission of the first data. In response to the request, the second device 120 may transmit, to the first device 110, a response message indicating the target resource allocated for transmission of the first data via the non-SDT procedure. The second device 120 may then receive the first data on the target resource via the non-SDT procedure.

In some other example embodiments wherein the first data is received in a non-SDT procedure, the second device 120 may receive, from the first device 110, a buffer status report (BSR) that indicates an amount of the first data. The second device 120 may allocate the target resource based on the BSR, and transmit, to the first device 110, a message indicating the target resource allocated for transmission of the first data in an RRC_CONNETED mode.

According to the example embodiments of the present disclosure, there is provided an enhanced SDT mechanism. The enhanced SDT mechanism supports multi-shot data transmissions via the SDT based on logical channel restrictions. The logical channel restrictions may be either dedicated to the SDT in the RRC_INACTIVE mode, or the same with the logical channel restrictions in the RRC_CONNECTED mode. Further, the error situation where data becomes available on a SDT DRB that is not allowed for the current SDT resources can be handled effectively. As such, the communication efficiency and system performance can be improved.

In some example embodiments, a first apparatus capable of performing any of the method 300 (for example, the first device 110) may comprise means for performing the respective steps of the method 300. The means may be implemented in any suitable form. For example, the means may be implemented in a circuitry or software module.

In some example embodiments, the first apparatus comprises: means for in response to first data to be transmitted via a small data transmission, SDT, corresponding to a first set of resources for a random access, RA, procedure and a second set of resources for a configured grant, CG, procedure, determining a target resource for at least a part of the first data based on a logical channel restriction on the SDT; and means for transmitting, to a second device, at least the part of the first data on the target resource.

In some example embodiments, the target resource corresponds to the part of the first data with a first priority associated with one of the RA procedure and the CG procedure, and the means for determining the target resource further comprises: means for in accordance with a determination that the first priority is higher than a second priority of the rest of the first data, or the first priority exceeds a priority threshold, selecting, from the first and second sets of resources, the target resource for transmission of the part of the first data via the SDT based on the corresponding one of the RA procedure and the CG procedure.

In some example embodiments, the target resource corresponds to a first amount of the part of the first data associated with one of the RA procedure and the CG procedure, and the means for determine the target resource further comprises: means for in accordance with a determination that the first amount is larger than a second amount of the rest of the first data, or the first amount exceeds an amount threshold, selecting, from the first and second sets of resources, the target resource for transmission of the part of the first data via the SDT based on the corresponding one of the RA procedure and the CG procedure.

In some example embodiments, the first apparatus further comprises: means for during transmission of the part of the first data on the target resource for one of the RA and CG procedures, determining that second data is to be transmitted via the SDT and corresponds to a first resource for the other one of the RA and CG procedures; means for in accordance with a determination that a second priority of the second data is higher than a first priority of the part of the first data, terminating the transmission of the part of the first data while transmitting the second data on the first resource based on the other one of the RA and CG procedures; and means for in accordance with a determination that the second priority of the second data is not higher than the first priority of the part of the first data, transmitting, to the second device, the second data based on the other one of the RA and CG procedures after the transmission of the part of the first data is completed.

In some example embodiments, the first apparatus further comprises: means for during transmission of the part of the first data on the target resource for one of the RA and CG procedures, determining that second data is to be transmitted in a non-SDT procedure; means for in accordance with a determination that a second priority of the second data is higher than a first priority of the part of the first data, terminating the transmission of the part of the first data while transmitting, to the second device, a request for initiating the non-SDT procedure for transmission of the second data; and means for in accordance with a determination that the second priority of the second data is not higher than the first priority of the part of the first data, transmitting, to the second device, a request for initiating a non-SDT procedure for transmission of the second data after the transmission of the part of the first data is completed.

In some example embodiments, the means for determining the target resource further comprises: means for transmitting, to the second device, a request for initiating a non-SDT procedure for transmission of the first data; and means for receiving, from the second device, a response message indicating the target resource allocated for transmission of the first data via the non-SDT procedure.

In some example embodiments, the means for determining the target resource further comprises: means for transmitting, to the second device, a buffer status report indicating an amount of the first data; and means for receiving, from the second device, a message indicating the target resource allocated for transmission of the first data in a radio resource control connected (RRC_CONNECTED) mode.

In some example embodiments, the first apparatus further comprises: means for receiving, from the second device, a first message comprising the logical channel restriction for determining the target resource, the first message comprising one of system information (e.g., system information block (SIB)) and a radio resource control message (e.g., RRCRelease message or RRCReconfiguration message).

In some example embodiments, the logical channel restriction indicates at least one of respective priorities of data, subcarrier spacing indexes, durations of uplink channel transmissions, cell information, grant indexes corresponding to the first set of resources and the second set of resources, or each of resources associated with at least one logical channel corresponding to one of a RA-based SDT procedure, a CG-based SDT procedure or a non-SDT procedure In some example embodiments, the first apparatus comprises a terminal device, and the second device comprises a network device.

In some example embodiments, a second apparatus capable of performing any of the method 400 (for example, the second device 120) may comprise means for performing the respective steps of the method 400. The means may be implemented in any suitable form. For example, the means may be implemented in a circuitry or software module.

In some example embodiments, the second apparatus comprises: means for transmitting, to a first device, a first message comprising a logical channel restriction on a small data transmission, SDT, performed between the first device and the second apparatus; and means for receiving, from the first device, at least a part of first data on a target resource determined based on the logical channel restriction.

In some example embodiments, the first message comprises one of system information and a radio resource control message.

In some example embodiments, the means for receiving at least a part of first data further comprises: means for receiving, from the first device, at least the part of the first data on the target resource via the SDT, the target resource determined from one of a first set of resources for a random access, RA, procedure and a second set of resources for a configured grant, CG, procedure.

In some example embodiments, the part of the first data is received based on the one of the RA and CG procedures, and the second apparatus further comprises: means for receiving a request for initiating a non-SDT procedure for transmission of second data from the first device while terminating the receipt of the part of the first data; means for transmit, to the first device, a response message indicating a second resource allocated for transmission of the second data via the non-SDT procedure; and means for receiving, from the first device, the second data on the second resource In some example embodiments, the first data is received in a non-SDT procedure, and the second apparatus further comprises: means for receiving, from the first device, a request for initiating the non-SDT procedure for transmission of the first data; and means for transmitting, to the first device, a response message indicating the target resource allocated for transmission of the first data via the non-SDT procedure.

In some example embodiments, the first data is received in a non-SDT procedure, and the second apparatus further comprises: means for receiving, from the first device, a buffer status report indicating an amount of the first data; and means for transmitting, to the first device, a message indicating the target resource allocated for transmission of the first data in a radio resource control connected (RRC_CONNECTED) mode.

In some example embodiments, the logical channel restriction indicates at least one of respective priorities of data, subcarrier spacing indexes, durations of uplink channel transmissions, cell information, grant indexes corresponding to a first set of resources for a random access, RA, procedure and a second set of resources for a configured grant, CG, procedure, or each of resources associated with at least one logical channel corresponding to one of a RA-based SDT, a CG-based SDT or a non-SDT procedure.

In some example embodiments, the first device comprises a terminal device, and the second apparatus comprises a network device.

Figure 5:
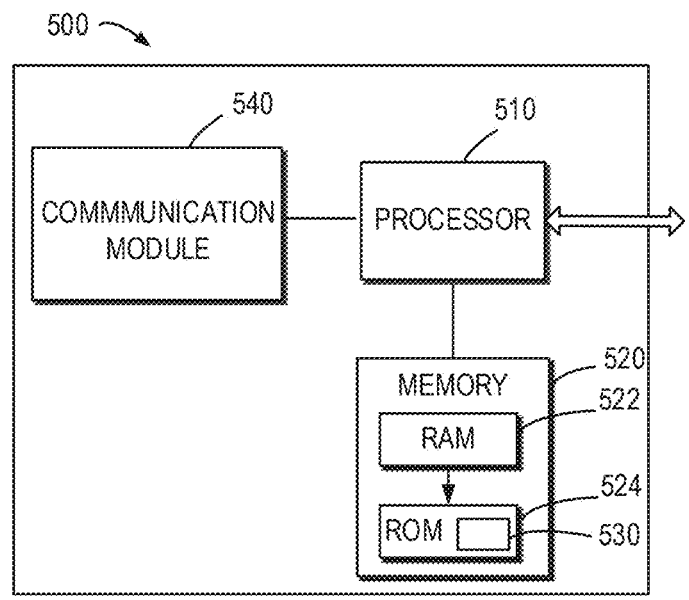
FIG. 5 illustrates a simplified block diagram of an apparatus that is suitable for implementing example embodiments of the present disclosure.

FIG. 5 is a simplified block diagram of a device 500 that is suitable for implementing embodiments of the present disclosure. The device 500 may be provided to implement the communication device, for example the first device 110 or the second device 120 as shown in FIG. 1. As shown, the device 500 includes one or more processors 510, one or more memories 520 coupled to the processor 510, and one or more transmitters and receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
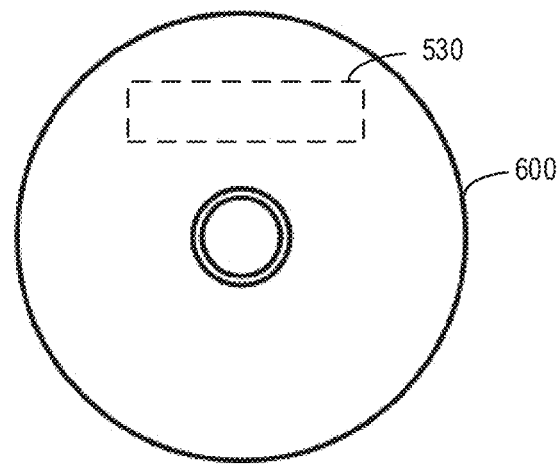
FIG. 6 illustrates a block diagram of an example computer readable medium in accordance with example embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 illustrates an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   wherein the at least one memory and the computer program code are configured to, with the at least one processor, cause the first device to:
   receive, in a radio resource control, RRC, connected mode, from a second device, a first message comprising a logical channel restriction for determining a target resource, the first message comprising a RRC release message, the logical channel restriction indicating each of resources associated with at least one logical channel corresponding to a configured grant, CG, based small data transmission, SDT, procedure;
   in response to first data to be transmitted in a RRC inactive mode via a SDT corresponding to a first set of resources for a random access, RA, procedure and a second set of resources for a configured grant, CG, procedure, determine, at the first device, the target resource for at least a part of the first data based on the logical channel restriction on the SDT; and
   transmit, in a RRC inactive mode, to the second device, at least the part of the first data on the target resource.

2. The first device of claim 1, wherein the target resource corresponds to the part of the first data with a first priority associated with one of the RA procedure and the CG procedure, and the at least one memory and the computer program code are configured to, with the at least one processor, cause the first device to determine the target resource by:
   in accordance with a determination that the first priority is higher than a second priority of the rest of the first data, or the first priority exceeds a priority threshold, selecting, from the first and second sets of resources, the target resource for transmission of the part of the first data via the SDT based on the corresponding one of the RA procedure and the CG procedure.

3. The first device of claim 2, wherein the at least one memory and the computer program code are configured to, with the at least one processor, further cause the first device to:
   during transmission of the part of the first data on the target resource for one of the RA and CG procedures, determine that second data is to be transmitted via the SDT and corresponds to a first resource for the other one of the RA and CG procedures;
   in accordance with a determination that a third priority of the second data is higher than a first priority of the part of the first data, terminate the transmission of the part of the first data while transmitting the second data on the first resource based on the other one of the RA and CG procedures; and
   in accordance with a determination that the third priority of the second data is not higher than the first priority of the part of the first data, transmit, to the second device, the second data based on the other one of the RA and CG procedures after the transmission of the part of the first data is completed.

4. The first device of claim 2, wherein the at least one memory and the computer program code are configured to, with the at least one processor, further cause the first device to:
   during transmission of the part of the first data on the target resource for one of the RA and CG procedures, determine that second data is to be transmitted in a non-SDT procedure;
   in accordance with a determination that a third priority of the second data is higher than a first priority of the part of the first data, terminate the transmission of the part of the first data while transmitting, to the second device, a request for initiating the non-SDT procedure for transmission of the second data; and
   in accordance with a determination that the third priority of the second data is not higher than the first priority of the part of the first data, transmit, to the second device, a request for initiating a non-SDT procedure for transmission of the second data after the transmission of the part of the first data is completed.

5. The first device of claim 1, wherein the target resource corresponds to a first amount of the part of the first data associated with one of the RA procedure and the CG procedure, and the at least one memory and the computer program code are configured to, with the at least one processor, cause the first device to determine the target resource by:
   in accordance with a determination that the first amount is larger than a second amount of the rest of the first data, or the first amount exceeds an amount threshold, selecting, from the first and second sets of resources, the target resource for transmission of the part of the first data via the SDT based on the corresponding one of the RA procedure and the CG procedure.

6. The first device of claim 1, wherein the at least one memory and the computer program code are configured to, with the at least one processor, cause the first device to determine the target resource by:
   transmitting, to the second device, a request for initiating a non-SDT procedure for transmission of the first data; and
   receiving, from the second device, a response message indicating the target resource allocated for transmission of the first data via the non-SDT procedure.

7. The first device of claim 1, wherein the at least one memory and the computer program code are configured to, with the at least one processor, cause the first device to determine the target resource by:
   transmitting, to the second device, a buffer status report indicating an amount of the first data; and
   receiving, from the second device, a response message indicating the target resource allocated for transmission of the first data in a radio resource control connected, RRC_CONNECTED, mode.

8. The first device of claim 1, wherein the first device comprises a terminal device, and the second device comprises a network device.

9. A second device comprising:
   at least one processor; and
   at least one memory including computer program code;
   wherein the at least one memory and the computer program code are configured to, with the at least one processor, cause the second device to:
   transmit, to a first device in a radio resource control, RRC, connected mode, a first message comprising a logical channel restriction on a small data transmission, SDT, performed between the first device and the second device, the first message comprising a RRC release message, the logical channel restriction indicating each of resources associated with at least one logical channel corresponding to a configured grant, CG, based SDT procedure; and
   receive, from the first device in a RRC inactive mode, at least a part of first data on a target resource determined based on the logical channel restriction.

10. The second device of claim 9, wherein the first message comprises a radio resource control message.

11. The second device of claim 9, wherein the at least one memory and the computer program code are configured to, with the at least one processor, cause the second device to receive at least a part of first data by:
   receiving, from the first device, at least the part of the first data on the target resource via the SDT, the target resource determined from one of a first set of resources for a random access, RA, procedure and a second set of resources for a configured grant, CG, procedure.

12. The second device of claim 11, wherein the part of the first data is received based on the one of the RA and CG procedures, and the at least one memory and the computer program code are configured to, with the at least one processor, further cause the second device to:
   receive second data on a first resource based on the other one of the RA and CG procedures while terminating the receipt of the part of the first data.

13. The second device of claim 11, wherein the part of the first data is received based on the one of the RA and CG procedures, and the at least one memory and the computer program code are configured to, with the at least one processor, further cause the second device to:
   receive a request for initiating a non-SDT procedure for transmission of second data from the first device while terminating the receipt of the part of the first data;
   transmit, to the first device, a response message indicating a second resource allocated for transmission of the second data via the non-SDT procedure; and
   receive, from the first device, the second data on the second resource.

14. The second device of claim 9, wherein the first data is received in a non-SDT procedure, and the at least one memory and the computer program code are configured to, with the at least one processor, further cause the second device to:
   receive, from the first device, a request for initiating the non-SDT procedure for transmission of the first data; and
   transmit, to the first device, a response message indicating the target resource allocated for transmission of the first data via the non-SDT procedure.

15. The second device of claim 9, wherein the first data is received in a non-SDT procedure, and the at least one memory and the computer program code are configured to, with the at least one processor, further cause the second device to:
   receive, from the first device, a buffer status report indicating an amount of the first data; and
   transmit, to the first device, a message indicating the target resource allocated for transmission of the first data in a radio resource control connected, RRC_CONNECTED, mode.

16. The second device of claim 9, wherein the first device comprises a terminal device, and the second device comprises a network device.

17. A method comprising:
   receiving, at a first device in a radio resource control, RRC, connected mode, from a second device, a first message comprising a logical channel restriction for determining a target resource, the first message comprising a RRC release message, the logical channel restriction indicating each of resources associated with at least one logical channel corresponding to a configured grant, CG, based small data transmission, SDT, procedure;
   in response to first data to be transmitted in a RRC inactive mode via a SDT corresponding to a first set of resources for a random access, RA, procedure and a second set of resources for a configured grant, CG, procedure, determining, at the first device and from the first set of resources and the second set of resources, the target resource for at least a part of the first data based on the logical channel restriction on the SDT; and
   transmitting, in a RRC inactive mode, to the second device, at least the part of the first data on the target resource.

18. A method comprising:
   transmitting, at a second device and to a first device in a radio resource control, RRC, connected mode, a first message comprising a logical channel restriction on a small data transmission, SDT performed between the first device and the second device, the first message comprising a RRC release message, the logical channel restriction indicating each of resources associated with at least one logical channel corresponding to a configured grant, CG, based SDT procedure; and receiving, from the first device in a RRC inactive mode, at least a part of first data on a target resource determined based on the logical channel restriction.

* * * * *